UNITED STATES PATENT OFFICE.

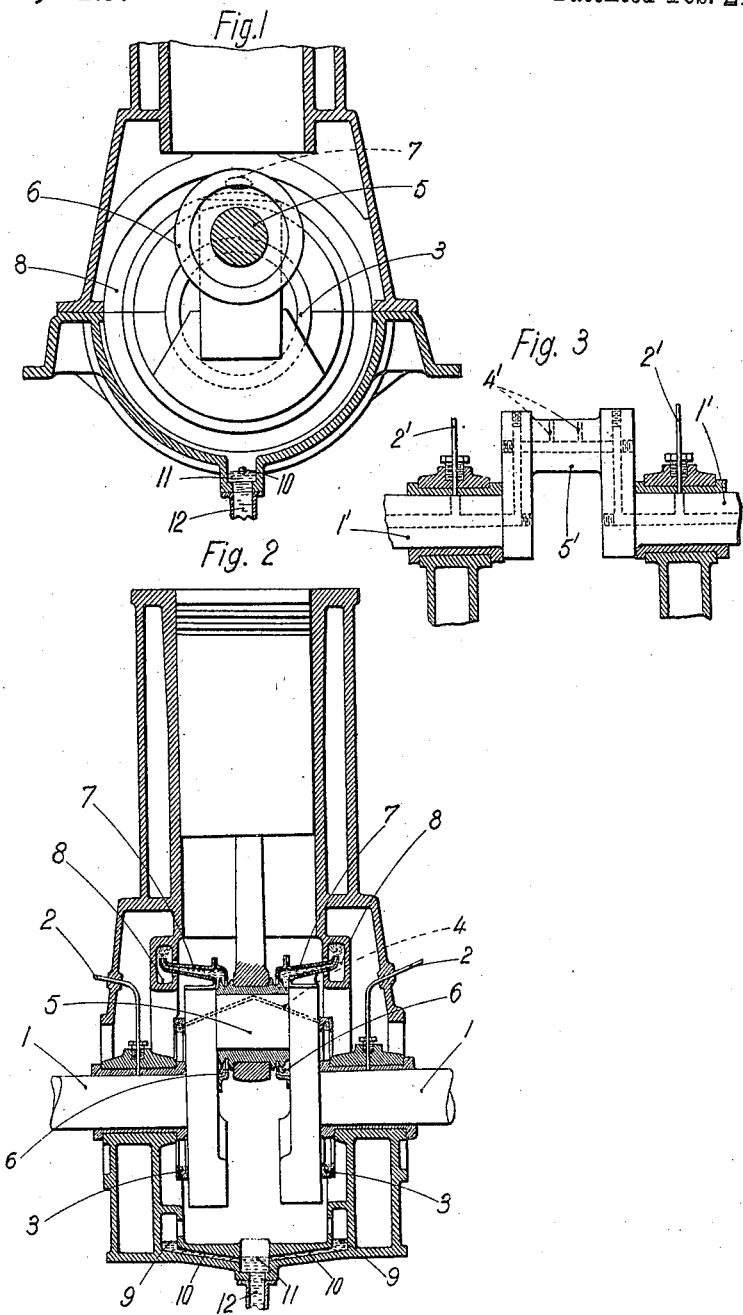

LÉON SAIVES, OF BOULOGNE-SUR-SEINE, FRANCE.

CONNECTING-ROD HEAD.

1,407,442. Specification of Letters Patent. Patented Feb. 21, 1922.

Application filed July 20, 1920. Serial No. 397,737.

*To all whom it may concern:*

Be it known that I, LÉON SAIVES, citizen of the French Republic, residing at Boulogne-Sur-Seine, Department of the Seine, in France, and having post-office address 15 Rue Gustave Sandoz, in the said city, have invented certain new and useful Improvements in or Relating to Connecting-Rod Heads; and I do hereby declare the following to be a full, clear, and exact description of the invention, such as will enable others skilled in the art to which it appertains to make and use the same.

The present invention relates to improvements in connecting rod heads and particularly to those forming part of the rod and crank arrangement of explosion and internal combustion engines. The invention has for its object to provide means to prevent the oil, coming from the lubricator of the head of the rod, being projected to the exterior.

The projection of this oil, as is well known, presents serious inconveniences especially in high speed motors, of the Diesel or semi-Diesel type. It obtains access to the working cylinder resulting in inferior combustion.

Figures 1 and 2 of the accompanying drawing show an arrangement in accordance with the present invention applied to the cylinder of a heat engine of the enclosed type.

Figure 1 is a cross section of the cylinder and Figure 2 is a longitudinal section of the same cylinder.

Figure 3 is an explanatory view of a method of lubricating frequently applied to the said rods and given by way of example for explanatory purposes.

Referring to Figure 2, the two bearings 1, of the crank shaft are fed with oil (under pressure or gravity) from the tubes 2; the oil escapes by the cheeks of the bushes and collects in the centrifugal rings 3, from which it flows by the oblique passages 4 provided in the webs and the crank pin 5 which serves to lubricate the crank pin head.

Another method of lubricating under pressure and known like the preceding arrangement, is shown in Figure 3. The bearings 1' receive the oil under pressure from the tubes 2'. 5' indicates the crank pin bored in accordance with a well known arrangement; the head of the connecting rod is then lubricated by one or more than one small hole 4'.

The oil after having lubricated the head of the connecting rod escapes naturally by the cheeks of the bushes and is collected by an annulus 6 secured on the web of the crank shaft. An ajutage 7 placed in the plane of the radius of the crank directs the oil circularly into a fixed annulus 8 secured to the interior of the crank casing or cast in one therewith. The oil there collects by gravity in the lower part of the annulus at 9 and flows by the passages 10 into a sump 11 from whence it is evacuated to the exterior by a tube 12 or in any other suitable manner.

From the above description it is obvious that no oil is projected into the crank casing. From this it follows that the head of the connecting rod and the crank webs move in an atmosphere devoid of oil and consequently any projection of oil on the piston and into the cylinder cannot take place, thus resulting in efficient combustion and less fuel consumption by the non-introduction of the oil into the cylinder.

Claims:

1. Means for collecting the excess oil which escapes from the bearings of connecting rods, comprising oil receiving annuli mounted adjacent to the cheeks of the bushings and movable therewith, fixed annuli forming gutters secured to or integral with the crank casing, means for conducting the excess oil from the movable annuli to the stationary annuli and a lower sump into which the oil directed into the stationary annuli is discharged.

2. Means for collecting the excess oil which escapes from the bearings of connecting rods, comprising oil receiving annuli mounted adjacent to the cheeks of the bearings and movable therewith, fixed annuli forming gutters secured to, or integral with the crank casing, tubular extensions from each movable annulus for conducting the excess oil from said movable annuli to the stationary annuli, a lower sump also integral with crank casing, into which the oil directed into the stationary annuli is discharged, and means for drawing off the oil from said sump.

In testimony whereof I affix my signature, in presence of two witnesses.

LÉON SAIVES.

Witness:
CLEMENT S. EDWARDS.